United States Patent [19]

Albanese

[11] Patent Number: 5,022,180
[45] Date of Patent: Jun. 11, 1991

[54] RODENT TRAP

[76] Inventor: Victor Albanese, 2222 63rd St., Brooklyn, N.Y. 11204

[21] Appl. No.: 405,037

[22] Filed: Sep. 11, 1989

Related U.S. Application Data

[63] Continuation-in-part of Ser. No. 186,442, Apr. 26, 1988, abandoned.

[51] Int. Cl.$^5$ .................... A01M 1/14; A01M 23/00
[52] U.S. Cl. .................................. 43/114; 43/131
[58] Field of Search ............... 43/114, 131, 58, 60, 43/61, 66, 136

[56] References Cited

U.S. PATENT DOCUMENTS

| | | | |
|---|---|---|---|
| 360,957 | 4/1887 | Gardner . | |
| 575,019 | 1/1897 | Wightman | 43/114 |
| 1,820,186 | 8/1931 | Gaskins | 43/131 |
| 2,115,449 | 4/1938 | Pradt | 43/114 |
| 2,177,670 | 10/1939 | Peirson | 43/114 |
| 2,258,683 | 10/1941 | Ketterer | 43/114 |
| 2,264,875 | 12/1941 | Grueling | 43/114 |
| 2,962,836 | 12/1960 | Hughes | 43/58 |
| 3,032,915 | 5/1962 | Giroud-Abel | 43/131 |
| 3,195,510 | 7/1965 | Bernstein | 43/114 |
| 3,304,646 | 2/1967 | Staley | 43/114 |
| 3,398,478 | 8/1968 | Pearsall | 43/114 |
| 3,685,199 | 8/1972 | Bradshaw | 43/114 |
| 3,864,866 | 2/1975 | Kosinsky | 43/58 |
| 3,965,609 | 6/1976 | Jordan | 43/131 |
| 4,031,654 | 6/1977 | Grey | 43/114 |
| 4,161,079 | 7/1979 | Hill | 43/114 |
| 4,395,842 | 8/1983 | Margulies | 43/114 |
| 4,418,493 | 12/1983 | Jordan | 43/61 |
| 4,438,584 | 3/1984 | Baker et al. | 43/58 |
| 4,685,244 | 8/1987 | Marks | 43/58 |

FOREIGN PATENT DOCUMENTS 0079255 5/1983 European Pat. Off. .
3127234 1/1983 Fed. Rep. of Germany .

OTHER PUBLICATIONS

Four page advertisement for "Trap-Stik", glue published by Southern Mill Creek Products Company, Inc., Tampa, Florida, received PTO 12/5/80.
Press release received PTO 12/5/80 "News from Gilbert, Whitney & Johns, Inc.", New Application for High-Strength Adhesive Found in Innovative Poisonless Pest Control.
A photograph of a known corner bait trap.
A sample of a Victor Hold Fast glueboard trap sold by Woodstream Corporation, Lititz, Pa.

Primary Examiner—Kurt Rowan
Attorney, Agent, or Firm—Kenyon & Kenyon

[57] ABSTRACT

The disclosure is directed to an adhesive type rodent tray including two tray elements connected to one another by a common flange area. Each of the tray elements is provided with an indented portion containing a layer of pressure sensitive adhesive material. The common flange area is arranged such that the two tray elements are co-planar and extend at a 90° angle, relative to one another.

5 Claims, 3 Drawing Sheets

FIG. 3
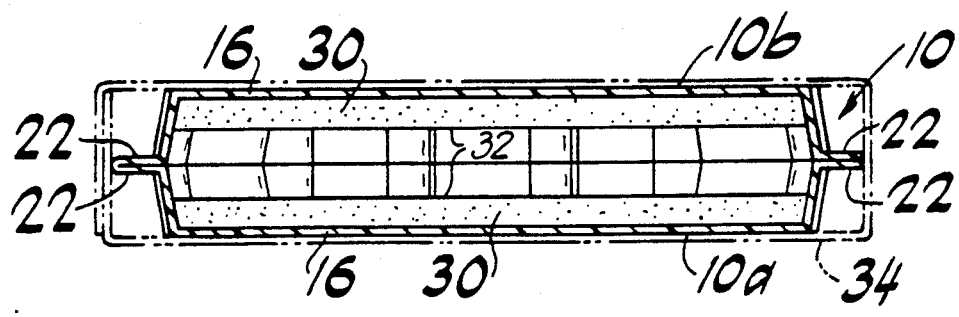
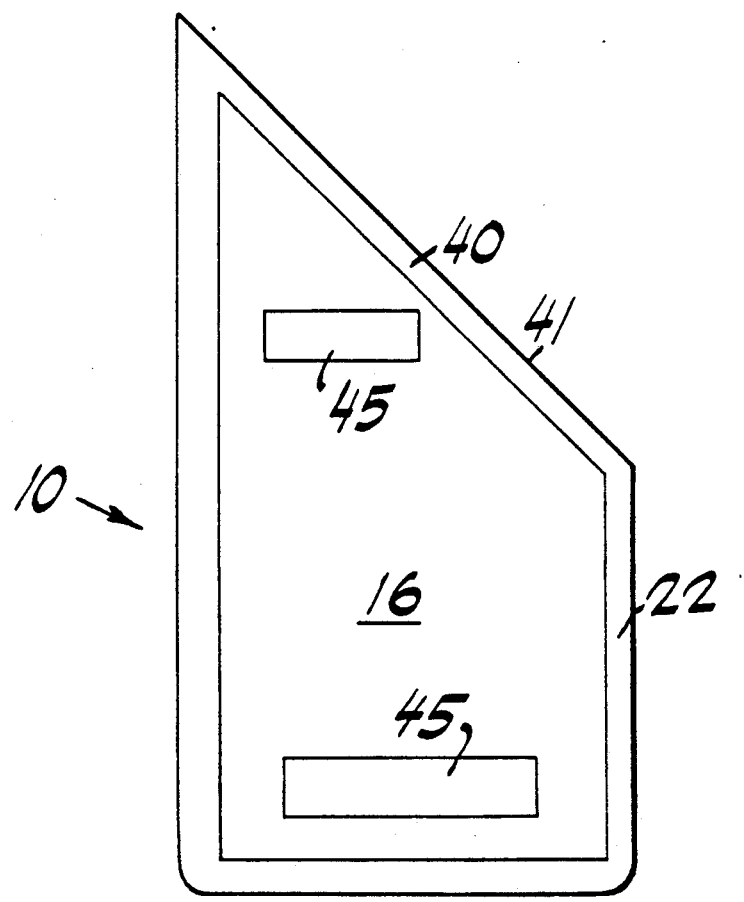
FIG. 4

RODENT TRAP

This is a continuation-in-part of co-pending application Ser. No. 186,442 filed on Apr. 26, 1988 now abandoned.

FIELD OF THE INVENTION

The invention is directed to an adhesive trap for rodents. More particularly, the trap comprises two non-porous plastic trays each containing a tacky layer which will trap, by self-adhesion, any rodent or other pest coming into contact therewith. The two trays are affixed to one another along a 45° corner fold line such that the two trays may be stored and shipped in an aligned, face-to-face abutting relation and then unfolded along the fold line to be in a side-by-side right angle relation, relative to one another, for placement in the corner of a room.

BACKGROUND OF THE INVENTION

Adhesive substances have been used heretofore for trapping vermin, specifically mice, by coating an adhesive substance onto a paper or cardboard backing which is then positioned in or around the runways where the vermin tend to move such that when they come into contact therewith, they are unable to extricate themselves and will either die or may be killed and then disposed of. Heretofore, the adhesive substances used have been either an unhardened glue, a sticky rosin material, or a plastic containing large amounts of a plasticizer. Such materials are characteristically in a semi-liquid state at normal ambient temperatures, preferably from 50° to 100° F.

In accordance with a known trap, a generally flat tray is provided from a non-porous plastic material and having at least one large central indentation into which a substantial thickness (less than the depth of the indentation) of a melted pressure sensitive adhesive is deposited and then allowed to cool. The trays are generally rectangular with a flat flange surrounding each indentation and adjacent edges of the flanges are joined by a flexible connection such that the trays can be folded with the indentations facing each other and with the flanges in abutment, all for ease of shipment. In addition, the flexible connection may be perforated so that the trays may be easily separated and used independently.

SUMMARY OF THE INVENTION

It is a primary objective of the present invention to provide an improved adhesive trap of the above-described type which includes a fold line connection between two trays, which fold line extends at a 45° angle with respect to the sides of each of the trays. In this manner, the trays may be folded about the fold line into a confronting relation to form a shipping package and unfolded to be in a side-by-side relation extending at a 90° angle relative to one another. Thus, the unfolded trays may be conveniently placed in the corner of a room, which is an effective trap placement position for the capture of mice and rats. Pursuant to another feature of the invention, the fold line can be perforated so that the trays may be easily separated from one another for independent use or to dispose of one of the trays after capture of a rodent therein.

In accordance with yet another feature of the invention, adhesive strips are provided on the bottom of each tray to fasten the tray to a floor surface. Accordingly, the tray will be securely positioned on the floor and may not be moved by a rodent in the event that the rodent sill has a free limb and attempts to use the free limb to escape from the trap position.

For a better understanding of the above and other features and advantages of the invention, reference should be made to the following detailed description and to the accompanying drawings.

BRIEF DESCRIPTION OF THE DRAWINGS

FIG. 3 is a cross-sectional view of the trays of FIG. 1 in the folded configuration.

FIG. 4 is a top plan view of the folded trays of FIG. 3.

DETAILED DESCRIPTION

Figure 1:
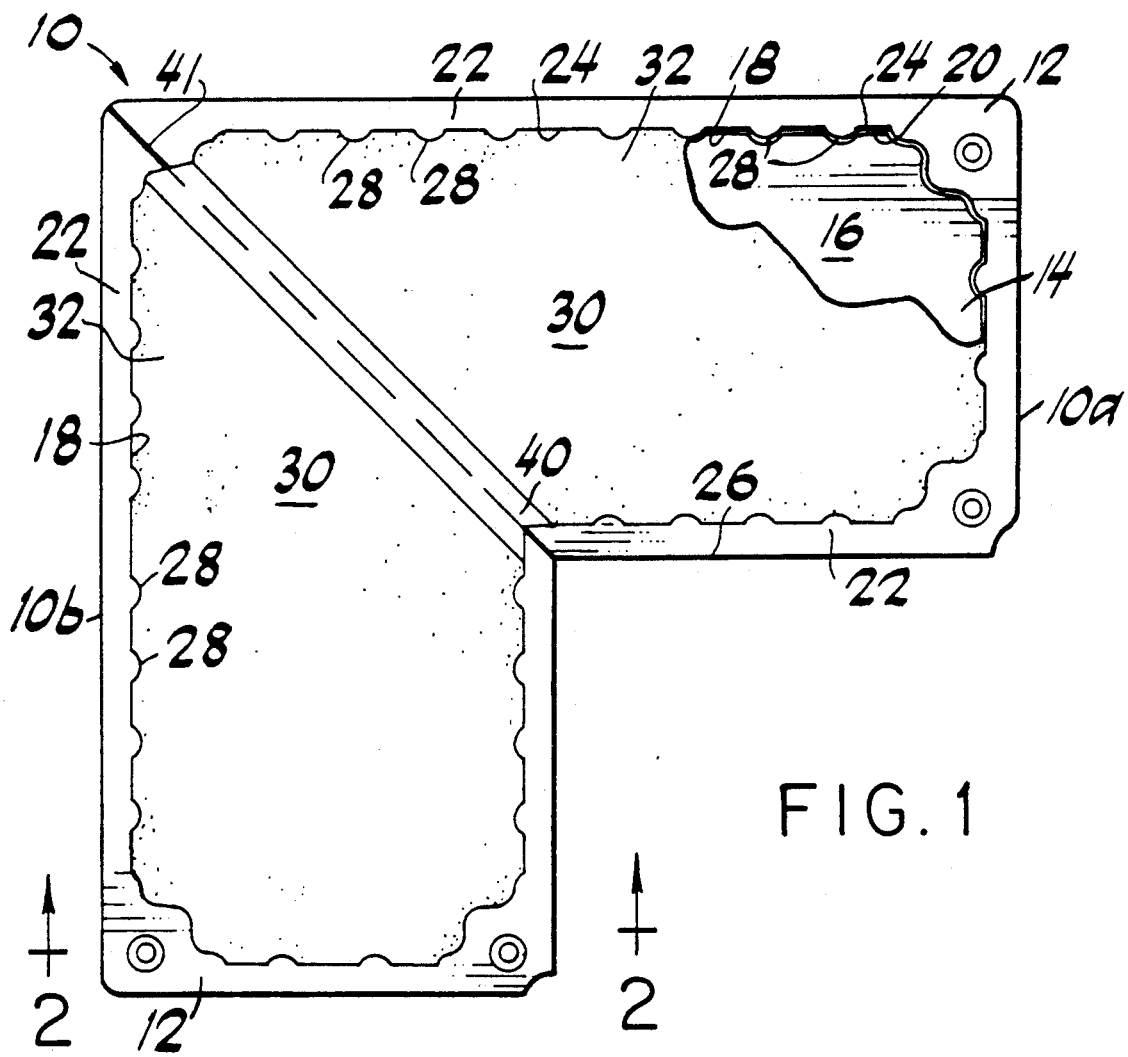
FIG. 1 is a top plan view of an adhesive type trap according to the invention.
Figure 2:
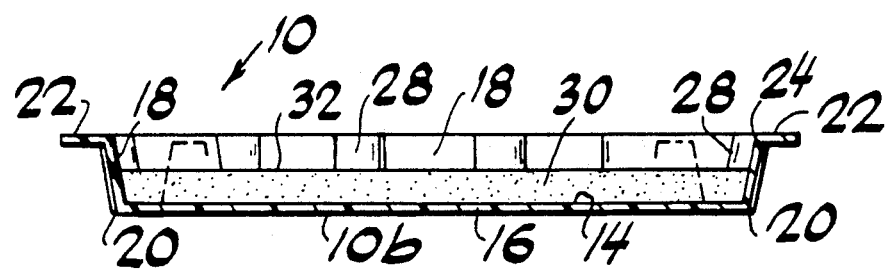
FIG. 2 is a side cross-sectional view of one of the trays of FIG. 1, taken generally along line 2—2.

Referring now to the drawings and initially to FIG. 1, there is illustrated an assembly of traps, generally indicated by reference numeral 10, constructed in accordance with the present invention. The assembly of the trap 10 includes a first trap portion 10a and a second trap portion 10b. Each trap portion 10a, 10b includes a generally flat trap 12 composed of a non-porous, thin sheet material shaped to include an indented portion 14. The material of which the trays 12 are composed is preferably a polymeric substance such as polyvinyl chloride, polystyrene, or polyethelane. The tray material is initially provided in the form of a sheet with sufficient dimensions for the trays 12 of a desired size and shape. The polymeric sheet is preferably shaped by a process of heating and then vacuum forming or stamping.

Each trap portion, 10a, 10b, includes a generally planar bottom 16 and generally vertical side walls 18. While the indented portion 14 may have any shape desired, the trap portion shown in FIG. 1 has an indented portion 14 of generally rectangular shape. Side walls 18 are formed integral with the planar bottom 16 at a bottom edge 20 of each of the side walls. A flange 22 entirely surrounds the indented portion 14 of each tray 10a, 10b and is integrally formed with the respective indented portion and connected at an upper edge 24 of the side walls.

Pursuant to the invention, a common flange area 40 is trap portions 10a, 10b to one another such that the trap portions 10a, 10b extend at a 90° angle relative to one another, as clearly illustrated in FIG. 1. Moreover, the common flange area 40 is formed in include a perforated, fold line 41 to permit the folding of one of the trap portions 10b about the fold line 41 until the flange 22 of the trap portion 10b abuts the flange 22 of the trap portion 10a (See FIGS. 3 and 4).

FIG. 3 illustrates the trap assembly 10 having the second trap portion 10b folded over the first trap portion 10a. Folding of the trap portions, one onto another, is easily accomplished as a result of perforated line 41 within the common flange 40. The folded trap assembly 10 is preferably placed within a package 34 for storage and/or shipping.

The side walls 18 of indented portions 14 include a plurality of ribs 28 extending generally vertically from bottom edge 20 at planar bottom 16 to upper edge 24 at flange 22. The ribs 28 are provided for the purpose of strengthening the trays 12 and preventing bending of the tray assembly 10 during handling or deployment.

A quantity of pressure sensitive adhesive material 30 is deposited within each indented portion 14. Such material has a plastic flow temperature at least above the highest ambient temperature to be expected, e.g., 120° F., and a melting temperature even higher, e.g., 200° F. to 250° F. Its surface remains pressure sensitive adhesive to about 120° F. This material is heated to the flow temperature, pumped or poured into the indentation and allowed to cool. When the adhesive material cools, a semi-solid state is retained and the material is fixed within each indented portion 14. At normal room temperatures, the adhesive material 30 is in a semi-solid state with a surface which adheres to any surface pressed thereagainst even under light pressure. The material 30 is deposited within the indented portion 14 in a quantity resulting in an upper surface 32 of the pressure sensitive adhesive material being below flange 22. Preferably, the adhesive material 30 is provided within each indented portion 14 to a level extending intermediate the bottom edge 20 and upper edge 24 of the side walls 18, preferably to a depth of at least 1/16 inch and not more than ⅛ inch.

When the trap portions 10a, 10b have been positioned within a run or path generally used by the vermin intended to be captured, the pressure sensitive adhesive material 30 restrains the vermin from leaving the trap once any portion of the vermin has contacted the pressure sensitive adhesive material. One characteristic of the pressure sensitive adhesive material involves the increase in holding strength proportional to forces directed thereagainst. In this respect, struggling efforts of a restrained rodent result in the pressure sensitive adhesive material 30 obtaining a stronger hold on the rodent.

Referring now to FIG. 4, strips 45 of adhesive material are mounted to the planar bottom surfaces 16 of the trap portions 10a, 10b. The adhesive strips 45 are initially covered by a removable sheet of paper, as is well known, which paper is removed just prior to placement of the unfolded trap portions 10a, 10b at a room corner position. The adhesive strips 45 will affix the trap portions 10a, 10b to the floor surface of the room for improved effectiveness in capturing mice and rats.

Figure 5:
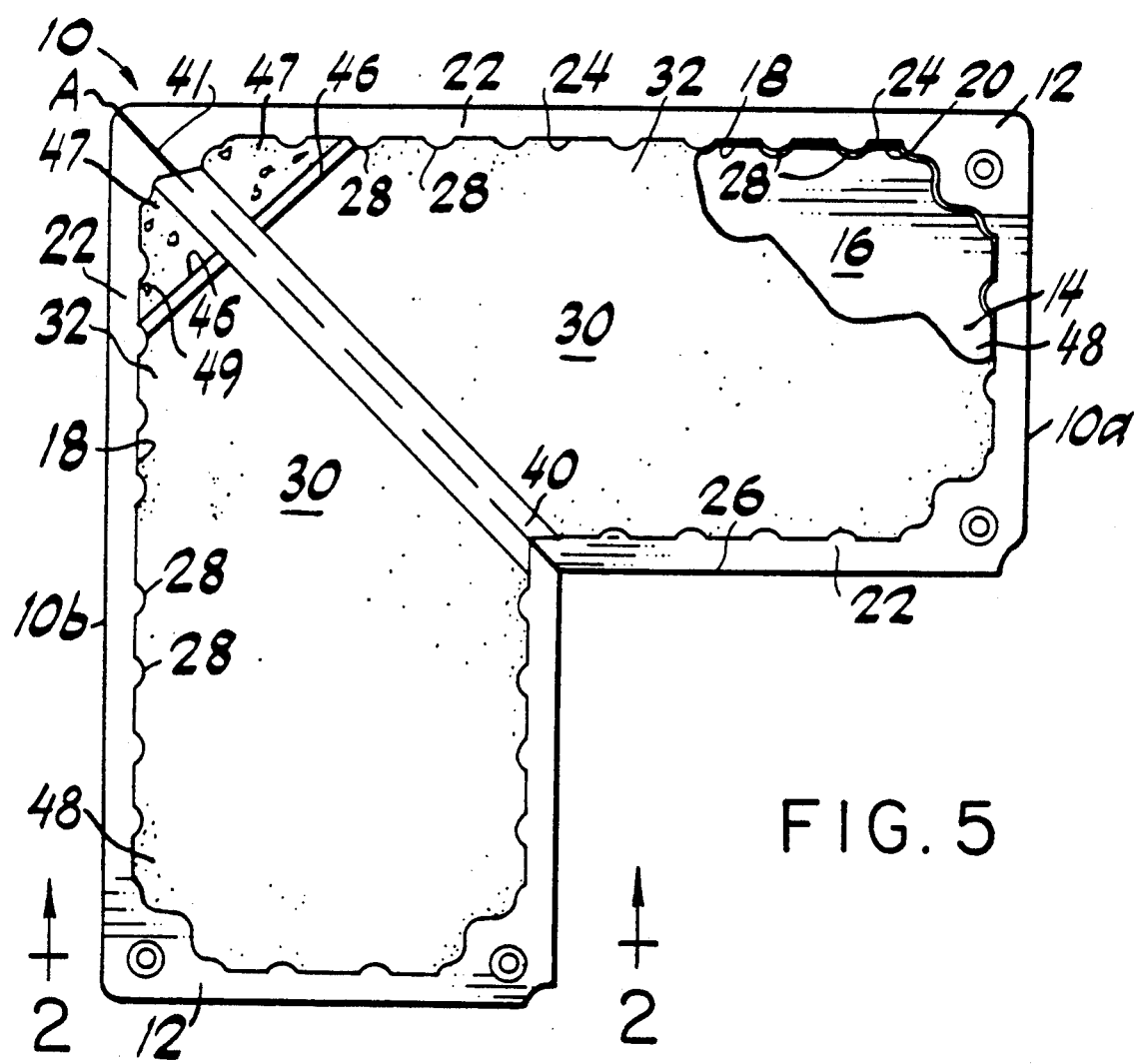
FIG. 5 is a top plan view of another embodiment of an adhesive type trap according to the invention.

FIG. 5 illustrates an additional embodiment of the invention. The trap of FIG. 5 is identical to the trap of FIG. 1 except that each of the trap portions 10a, 10b includes a wall section 46 extending across the indented portion 14 to divide the indented portion 14 of each trap portion 10a, 10b into two sections 47, 48. As in the previous embodiment, adhesive material 30 is deposited in each of the sections 48.

The section 47 of each trap section 10a, 10b is used to contain a bait material 49 to attract vermin to the trap 10. The bait material can be poisonous to the vermin to cause the death of the vermin after it is trapped by the adhesive material 30.

The wall portions 46 are preferably positioned such that the bait sections 47 together form a triangular corner bait receptacle, as illustrated in FIG. 5. The triangular corner bait receptacle of the side-by-side bait sections 47 is positioned at the corner A of the trap 10. In this manner, the bait receptacle will be closely adjacent the intersection of the walls of a room corner when the trap 10 is placed in the corner. Thus, any vermin attracted to the trap 10 by the bait would necessarily have to enter upon one of the sections 48 containing the adhesive material 30 to approach the bait 49 and will be trapped in any attempt to obtain the bait 49.

What is claimed is:

1. A trap for vermin which comprises:
two tray elements;
each of said tray elements including an indented portion;
a wall element extending within at least one indented portion to divide the at least one indented portion into at least two section;
a bait material contained in one of the at least two sections;
a layer of pressure sensitive adhesive material contained in the other of the at least two sections and the other indented portion;
a common flange area integral with each of said tray elements to connect said tray elements to one another;
said common flange area being arranged so that the two tray elements are co-planar and form a 90° angle therebetween; and
wherein the one of the at least two sections containing the bait material is arranged adjacent an outer corner A of the two tray elements.

2. The rodent trap of claim 1 wherein the bait material is poisonous.

3. The rodent trap of claim 1 and further including a fold line formed in the common flange area to permit the folding of the two tray elements relative to one another into a confronting, abutting relation.

4. The rodent trap of claim 3 wherein the fold line is perforated to permit the separation of the two tray elements.

5. The rodent trap of claim 1 and further an adhesive element mounted to an external bottom portion of at least one of the tray elements to affix the rodent trap to a floor surface.

* * * * *